July 13, 1926.
1,592,674
C. R. NICHOLS
METHOD OF AND APPARATUS FOR REMOVING DELETERIOUS MATERIALS FROM
THE INNER SURFACES OF BODIES FORMED OF PLASTIC MATERIAL
Filed March 22, 1926     2 Sheets-Sheet 1
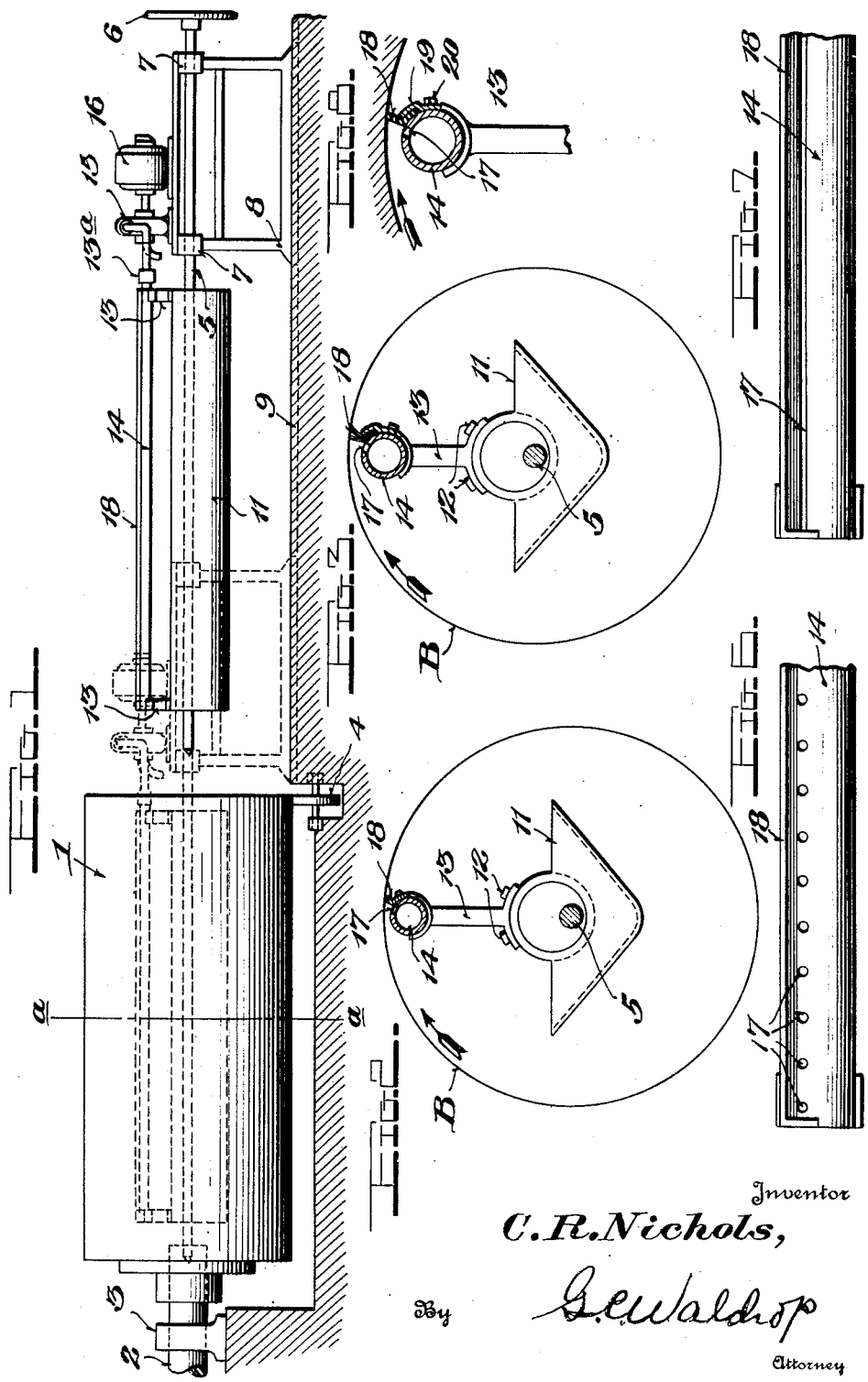
Inventor
C. R. Nichols,
By G. C. Waldrop
Attorney July 13, 1926. 1,592,674
C. R. NICHOLS
METHOD OF AND APPARATUS FOR REMOVING DELETERIOUS MATERIALS FROM
THE INNER SURFACES OF BODIES FORMED OF PLASTIC MATERIAL
Filed March 22, 1926  2 Sheets-Sheet 2
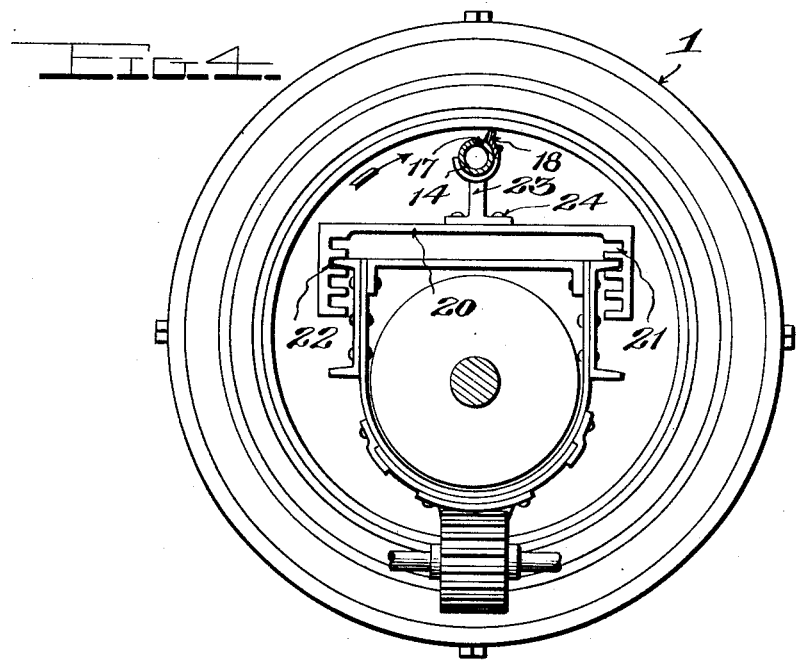
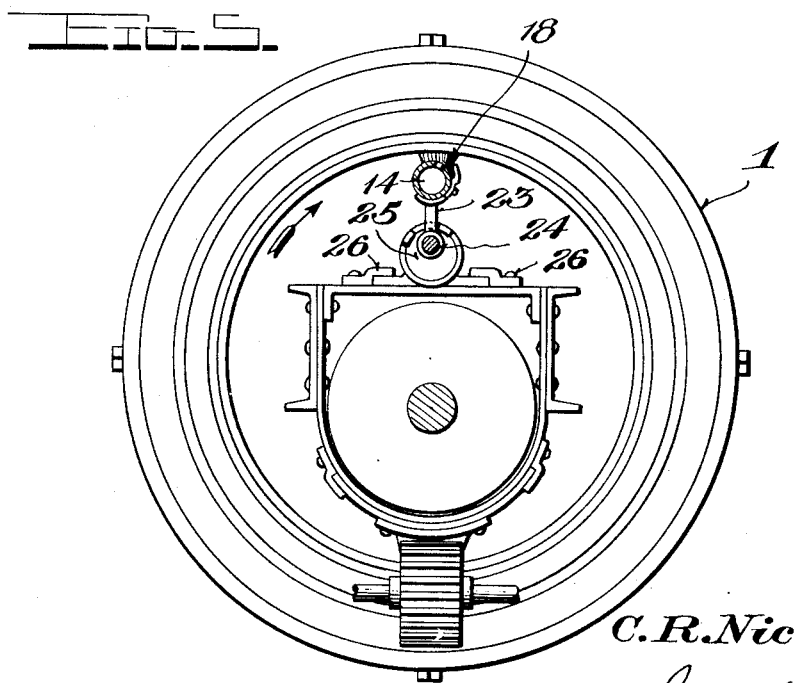
Inventor
C. R. Nichols,
By G. C. Waldrip
Attorney Patented July 13, 1926.

1,592,674

UNITED STATES PATENT OFFICE.

CLIFFORD RALPH NICHOLS, OF DETROIT, MICHIGAN.

METHOD OF AND APPARATUS FOR REMOVING DELETERIOUS MATERIALS FROM THE INNER SURFACES OF BODIES FORMED OF PLASTIC MATERIAL.

Application filed March 22, 1926, Serial No. 96,611, and in France December 7, 1925.

This invention relates to the manufacture of hollow bodies of plastic material by centrifugal processes.

More particularly the invention relates to means and methods of removal of water and fine light particles from the inner face of a centrifugally forming body composed of a plastic mass.

In the manufacture of concrete pipe by centrifugal process, I have found that to produce a smooth and polished inner surface it is very desirable to remove the water brought to the inner surface of the forming body as nearly instantly as possible after the same is brought to the inner surface of the body by and during densification of the mass.

I have also found that during the early stages of densification the plastic mass is very sensitive on its inner surface and contact thereupon or therewith by any mechanical means is likely to scar or injure the surface of the body.

By the practice of my present invention these difficulties may be readily overcome.

The invention is novel and possesses many advantages in that it is inexpensive to construct and operate as will be readily understood from the following description together with the accompanying drawings wherein:—

Fig. 1 is a side elevation of centrifugal plastic ware machine equipped with apparatus embodying my invention;

Fig. 2 is an interior end view of a centrifugal mold with my invention mounted upon the material feeding means;

Fig. 3 is a modification of Figure 2;

Fig. 4 shows my invention mounted upon another type of material feeding means than shown in Figs. 1, 2 and 3.

Fig. 5 is a modification of Fig. 4;

Fig. 6 is a detail view of one form of water collector.

Fig. 7 is a different form of water collector to that shown in Fig. 6;

Fig. 8 is a cross section of Fig. 7, showing a flexible collector mounted thereon.

In Figure 1 is a mold which may be rotated at will by any source of power, not shown, as by connecting to shaft 2, said shaft 2 being securely connected to mold 1, and supporting one end thereof, and rotatably mounted in journal 3, while the opposite end of the mold is supported upon idler rollers 4. 5 is a shaft upon which hand wheel 6 is fixed, the shaft being eccentrically rotatably mounted in bearings 7—7 in the support 8. The latter being movable along the bed plate 9 to thereby carry with it the material feeding and removal means into and out of the mold as indicated by the dotted line and full line positions. Upon shaft 5 is mounted a material feeding trough 11 also shown in Figs. 2 and 3 and removably supported thereon, as by studs 12, are brackets 13.

Brackets 13 carry a pipe 14 which is closed at one end, and to the opposite end is attached flexible hose 13ª leading to fan or pump 15 operated by motor 16 to produce a suction in pipe 14; which latter has openings in and along its upper face as indicated at 17 in Figs. 2—3—6—7 and 8. As indicated in Fig. 6 this opening may be a series of small holes, while, as shown in Fig. 7 it may be a longitudinal slot, as desired by the operator. The openings in either case serving for the suction of the water into and through the pipe by means 15 of Fig. 1.

Figures 2 and 3 are cross sections taken at $a$—$a$ of Fig. 1 when the material feeding and water removing mechanism is in operative position. In Figs. 2 and 3 the circular line B represents the inner surface of the forming or densifying pipe body.

The pipe 14 may have mounted thereupon as shown in Fig. 8, a fin of metal as shown in Figs. 1 and 2 of a rubber or other flexible substance as shown in a Fig. 8 or a brush shown in Fig. 3. In either case such element designated by numeral 18 is secured to pipe 14 by clamp 19 held into place by stud 20 threaded into pipe 14. This fin of metal, flexible element or brush 18 may be set in spiral sections along pipe, and as shown in Fig. 5.

The operation is as follows:

Mold one is rotated and a charge, or successive charges of plastic material are placed and evenly distributed upon the inner surface of the mold, as by trough 11, and the speed of rotation of the mold is regulated to cause separation of excess water and light particles from the mass and to bring the same to the inner surface of the densifying body.

The entire material feeding and water collecting apparatus then being brought into the position indicated by the dotted lines of Fig. 1, hand wheel 6 is turned which rotates the shaft 5 in the eccentric bearings 7 which brings water collecting pipe 14 as near to the inner surface of the densifying body as desired. Motor 16 is then started which actuates pump 14 thereby drawing, by suction, the water and fine light materials off of the surface of the densifying body, through openings 17 in pipe 14, thence through pipe 14, flexible connection 13ª, pump 15 and thence discharged, to any position desired.

It will be understood that by turning hand wheel 6 and rotating shaft 5 in its eccentric bearings 7—7 pipe 14 may be adjusted to follow up the wall of the body as it recedes away from its axis of rotation due to densification, or to move away from the body should more material be added in building up the body. Also a fin, brush or flexible element 18 may be provided to arrest the centrifugal movement of the water and thereby assist in its removal, however these elements or any of them are in no case used as a finishing scraping or troweling tool to be brought into contact with the pipe body. Their only function being, when used, to arrest the movement of the water and the articles in floatation therewith that the suction means may convey the same away from the pipe surface. No means other than the openings shown as small holes or a longitudinal slot in the pipe 14 will be needed, except when the body is rotated at such high speeds that the centrifugal action or force upon the water, at the time it is sought to remove the latter, is so great the vacuum created by the suction means is insufficient to overcome it.

As indicated above the pipe 14 extends the entire length of the mold and has either a longitudinal opening therein as shown in Fig. 7 or a series of openings as shown in Fig. 6, and in either case the water removal means is longitudinally movable relative to the body being formed, by and with the material feeding means, and at the same time is adjustable laterally of the surface of the forming body that it may be in operative relation therewith at all times as the thickness of the wall body varies.

In Figs. 4 and 5 are shown a modification of the means above described in that pipe 14 may be of less length than the whole length of the mold 1 or the forming body therein, and may be movable independently of the material feeding means both longitudinally and laterally of the forming body.

In Figs. 4 and 5 end views of the molds and feed troughs in operative position are shown as in my prior Patent 1,457,185, with my present invention mounted thereon.

In Fig. 4 the bracket 20 having slots or channels 21 therein is slidably mounted along the projecting edges 22 of the trough structure. Mounted upon bracket 20 is a support 23 secured thereto by studs 24. The support carries pipe 14 as heretofore explained.

In this structure the pipe 14 may be of any length desired and be connected with pump 15 by a long flexible hose as 13ª of Fig. 1, which will permit of the movement of the pipe longitudinally of the material feeding mechanism such movement being accomplished controllably by the operator at will. By engaging selectively the various slots of bracket 20 with trough edge 22 pipe 14 is adjusted into operative relation, laterally with the varying diameter of the inner surface of the forming or densifying body. Pipe 14 may or may not have, fin or brush 18 attached thereto as desired.

Fig. 5 is a modification of Fig. 4 in that the support 23 is mounted eccentrically about shaft 24 as at 25. The eccentric mounting being slidable along the top of the feed trough and held thereon by channel guides 26.

By rotating shaft 24 about its eccentric bearing the pipe 14 is moved toward or away from the inner surface of the densifying body and may be moved longitudinally thereof, as by shaft 24, to effect removal of the water at any point along the length of the forming body.

The fin, brush or flexible element 18 shown in detail in Fig. 8 is secured to pipe 14 by clamp 19 which is fastened to pipe 14 by studs 20, one edge of clamp 19 overlapping element 18, whereby upon screwing up studs 20 element 18 will be securely gripped.

What is claimed is:—

1. The method of removing deleterious matter and water from the inner surface of a centrifugally densifying plastic body which consists in removing the same by suction.

2. The method of removing deleterious matter and water from the inner surface of a centrifugally densifying plastic body which consists in removing the same by suction while the body is rotating.

3. The method of removing deleterious matter from the inner surface of a centrifugally densifying mass which consists in removing such water from the entire length of the body simultaneously by suction.

4. The method of removing deleterious matter from the inner surface of a centrifugally densifying mass which consists in removing such water from the entire length of the body simultaneously by suction, as is brought to the surface thereof during densification.

5. The method of disposal of deleterious material from the inner surface of a hollow rotating body consisting of collecting said material with suction into a pipe and conveying the same away from the body.

6. Suction means for removal of deleterious matter from the interior of a densifying hollow plastic body, said means being longitudinally movable within the body and adjustable laterally thereof to follow up the varying diameter of the body.

7. Suction means for removal of water from the interior of a densifying hollow plastic body, said means being longitudinally movable within the body and adjustable laterally thereof to follow up the varying diameter of the body, said means being carried by material feeding means.

8. The method of removal of deleterious material from the surface of a hollow rotating body which consists in removing the same by and with a current of fluid from such surface and out of the body.

In testimony whereof I affix my signature.

CLIFFORD RALPH NICHOLS.